United States Patent [19]

Uota et al.

[11] Patent Number: 4,677,562
[45] Date of Patent: Jun. 30, 1987

[54] AUTOMOTIVE NAVIGATION SYSTEM

[75] Inventors: Kousaku Uota; Hisatsugu Itoh, both of Himeji, Japan

[73] Assignee: Mitsubishi Denki Kabushiki Kaisha, Japan

[21] Appl. No.: 732,565

[22] Filed: May 10, 1985

[30] Foreign Application Priority Data

May 15, 1984 [JP] Japan .................................. 59-95511

[51] Int. Cl.$^4$ ............................................. G06F 15/50
[52] U.S. Cl. ................................... 364/449; 364/571; 340/988; 340/995; 73/178 R
[58] Field of Search ............... 364/443, 449, 460, 521, 364/571; 340/988, 995; 73/178 R; 343/451; 342/451

[56] References Cited

U.S. PATENT DOCUMENTS

| | | | |
|---|---|---|---|
| 4,470,119 | 9/1984 | Hasebe et al. | 364/521 |
| 4,513,377 | 4/1985 | Hasebe et al. | 364/449 |
| 4,535,335 | 8/1985 | Tagami et al. | 364/449 |
| 4,543,572 | 9/1985 | Tanaka et al. | 364/449 |
| 4,571,684 | 2/1986 | Takanabe et al. | 364/449 |

OTHER PUBLICATIONS

"Cathode-Ray Tube Information Center with Automotive Navigation" by M. W. Jarvis and R. C. Berry.

"On-Board Computer System for Navigation, Orientation, and Route Optimization" by P. Haeussermann.

Primary Examiner—Gary Chin
Attorney, Agent, or Firm—Leydig, Voit & Mayer

[57] ABSTRACT

An automotive navigation system wherein a storage means included in the system has not stored therein picture information of an actual map, but instead has stored therein the geographical names and the geographical positions of points as well as the declination of the earth magnetism of the points. When the geographical names of a departure point and a destination point are entered through an input unit, a control circuit reads out from the storage means the respective positions of the points entered. The control circuit controls a display unit to display on a display screen marks respectively indicating the departure point, the destination point, and the current position of a vehicle on an adequately reduced scale determined by the positions of these points. A point nearest to the current position of the vehicle while the vehicle is being driven is determined and retrieved by the control circuit from the storage means. On the basis of the declination information of this retrieved point, the detected vehicle heading direction is corrected to make an accurate computation of the current position of the vehicle.

6 Claims, 20 Drawing Figures

FIG. 4
"Kana" TABLE

| | 41a1 | 41a2 | 41a3 | 41a4 | 41a5 | DEFINITION OF SOUND |
|---|---|---|---|---|---|---|
| 41a | A | I | U | E | O | CLEAR SOUND |
| 41b | KA | KI | KU | KE | KO | CLEAR SOUND |
| 41c | SA | SHI | SU | SE | SO | CLEAR SOUND |
| 41d | TA | CHI | TSU | TE | TO | CLEAR SOUND |
| 41e | NA | NI | NU | NE | NO | CLEAR SOUND |
| 41f | HA | HI | FU | HE | HO | CLEAR SOUND |
| 41g | MA | MI | MU | ME | MO | CLEAR SOUND |
| 41h | YA | | YU | | YO | CLEAR SOUND |
| 41i | RA | RI | RU | RE | RO | CLEAR SOUND |
| 41j | WA | | | | | CLEAR SOUND |
| 41ℓ | (GA) | (GI) | (GU) | (GE) | (GO) | VOICED SOUND |
| 41m | ZA | JI | ZU | ZE | ZO | VOICED SOUND |
| 41n | DA | JI | ZU | DE | DO | VOICED SOUND |
| 41o | BA | BI | BU | BE | BO | VOICED SOUND |
| 41p | PA | PI | PU | PE | PO | SEMI-VOICED SOUND |
| 41q | KYA | | KYU | | KYO | CONTRACTED SOUND |
| 41r | SHA | | SHU | SHE | SHO | CONTRACTED SOUND |
| 41s | CHA | | CHU | CHE | CHO | CONTRACTED SOUND |
| 41t | NYA | | NYU | | NYO | CONTRACTED SOUND |
| 41u | HYA | | HYU FYU | | HYO | CONTRACTED SOUND |
| 41v | MYA | | MYU | | MYO | CONTRACTED SOUND |
| 41w | RYA | | RYU | | RYO | CONTRACTED SOUND |
| 41x | GYA | | GYU | | GYO | VOICED CONTRACTED SOUND |
| 41y | JA | | JU | JE | JO | VOICED CONTRACTED SOUND |
| 41z | BYA | | BYU | | BYO | VOICED CONTRACTED SOUND |
| 41zz | PYA | | PYU | | PYO | SEMI-VOICED CONTRACTED SOUND |
| 41k | N | | | | | |

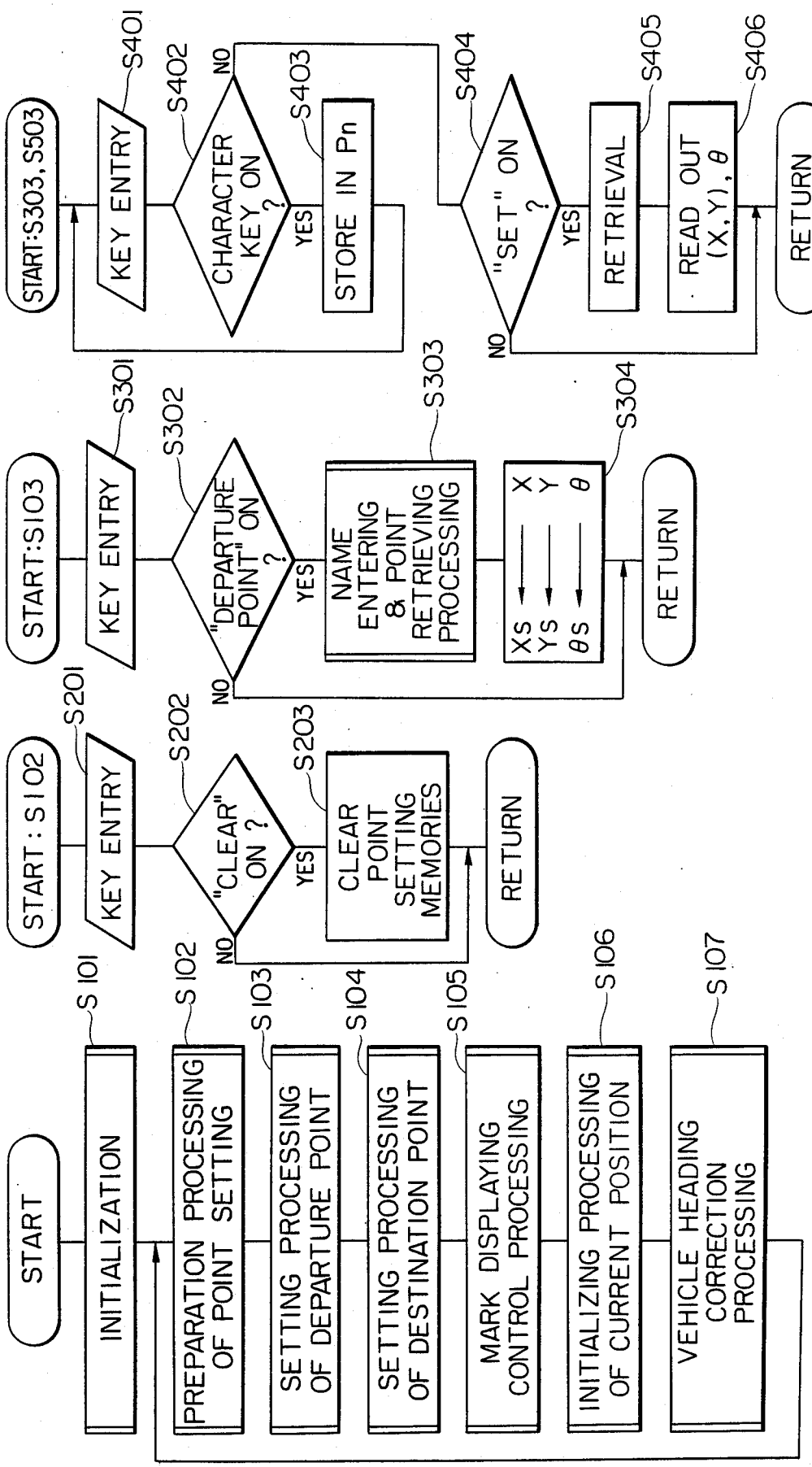

FIG. 8E
FIG. 8F
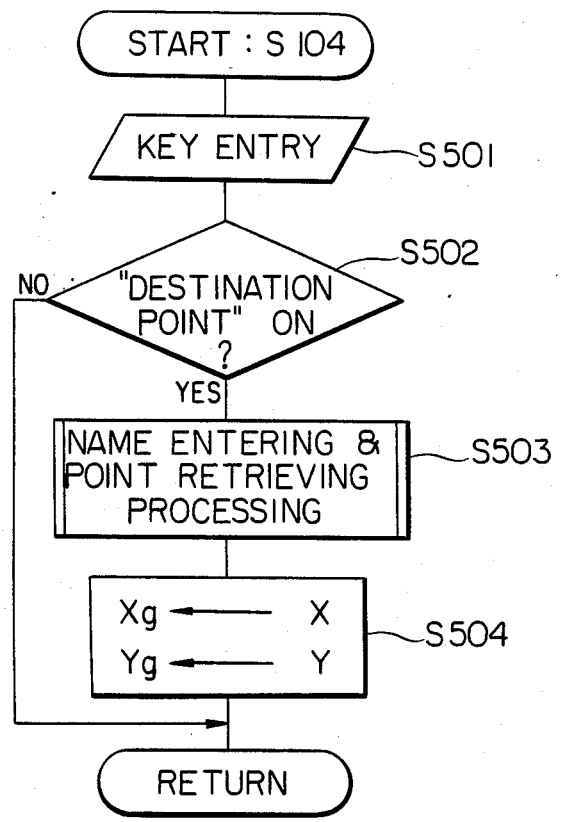
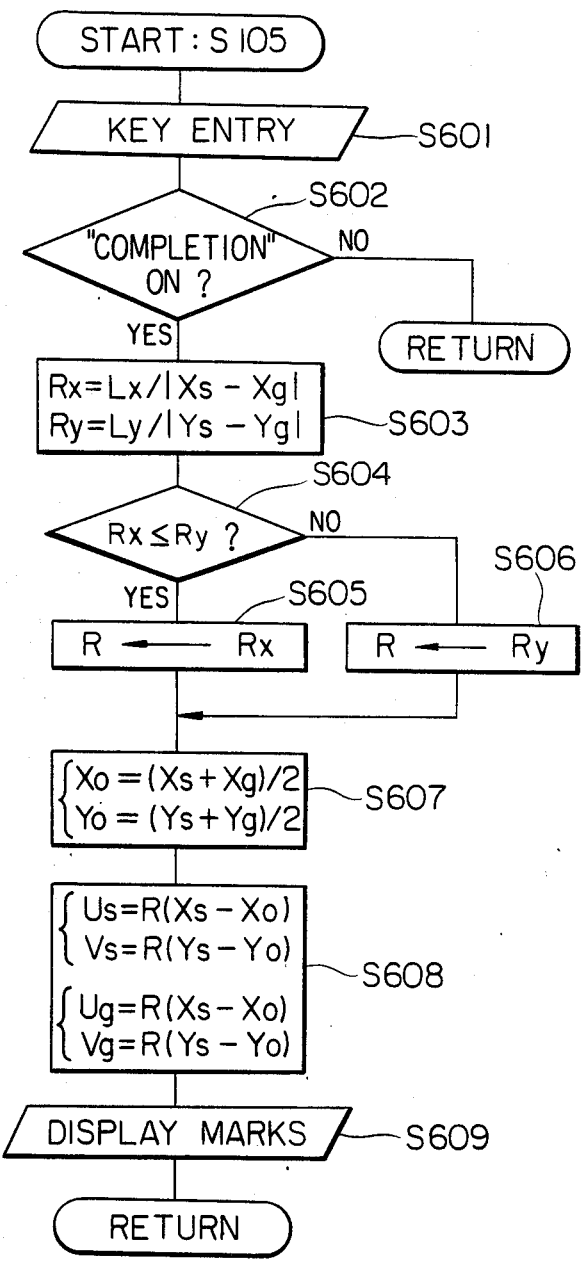

AUTOMOTIVE NAVIGATION SYSTEM

BACKGROUND OF THE INVENTION

This invention relates to an automotive navigation system, and in particular to an automotive navigation system wherein a departure point, a destination point, and the current position of a vehicle are displayed with respective marks on a display such as a cathode ray tube.

Such an automotive navigation system has been already proposed in Japanese Patent Application Laid-open No. 58-146814. This conventional system detects the running distance and the heading of a vehicle and computes the current position of the vehicle from those information. This system displays the current position of the vehicle according to the computed result on a display such as a CRT while at the same time displaying a map as picture information read out from a storage means on the display in a superposed manner, whereby a driver can determine the current position of the vehicle from the map and the mark imaged on the display.

However, since an extremely numerous amount of information is required to display the picture information forming a map, a storage means for storing such amount of information and therefore a navigation system per se must be correspondingly large-scaled and expensive. Accordingly, it is desirable to develop a small-sized and cheap navigation system suitable for boarding on a vehicle.

In a case where a departure point and a destination point are predetermined, even though a map stored in the memory is displayed on the display and a mark indicating the current position of the vehicle is displayed in such a superposed manner, the map to be displayed on a reduced scale is in certain conditions so small that the current position of a vehicle can not be clearly seen. Furthermore, if the distance between the departure point and the destination point is far so as to require a plurality of sequential maps, it is very hard and cumbersome to grasp the entire running route.

Although it is not necessarily impossible to solve these technical problems with a memory having a large capacity as well as a high speed arithmetic device, the size of the whole system becomes very large so that it is difficult to mount the same in the vehicle both physically and economically.

Also, in a case where the heading of a vehicle is measured by detecting the earth magnetism, the heading to be detected is provided with a relative angle derived from the direction of the earth magnetism and the running direction of the vehicle (vehicle heading) and therefore it often disagrees with the actual geographical heading. In other words, while the direction of the earth magnetism generally points from the south to the north, the actual geographical north often disagrees with the direction of the earth magnetism depending on which region of the earth is being considered. The angular difference between both of the above is called a declination. In Japan, for example, there are declinations of between 5-10 degrees towards the west.

Therefore, if the mark of the current position of the vehicle computed by the use of the vehicle heading detected on the basis of the direction of the earth magnetism is displayed in a superposed manner on the screen displaying a map prepared on the basis of the geographical north, there will be a considerable error between the true or actual current position and the current computed and displayed position.

In order to eliminate an error due to such a declination, a system which sets a declination value through an external operation for the region where the vehicle is presently running and which corrects, based on the set value, the running heading detected has been disclosed in, e.g. Japanese Patent Application Laid-open No. 58-5610. However, this system has a disadvantage that the declination value must be set over again whenever the region where the vehicle is running changes, causing complicated operations.

On the other hand, there have been disclosed, "Cathode-Ray Tube Information Center with Automotive Navigation" published in SAE Technical Paper Series 840485 by M. W. Jarvis and R. C. Berry, and "On-Board Computer System for Navigation, Orientation, and Route Optimization" published in SAE Technical Paper Series 840313 by P. Haeussermann. Both publications are based on an international Congress & Exposition held in Detroit, Michigan on Feb. 27–Mar. 2, 1984. In the former literature, an approximate position of a vehicle is determined from the communication with a satellite, and a more accurate position is determined and displayed on the CRT by means of a self-contained navigation using an earth magnetism sensor in the vehicle. The latter literature discloses a composite system of a route guide system in trunk (main) highways using distance information and a destination indicating system within a city using distance information and heading information.

SUMMARY OF THE INVENTION

It is accordingly an object of the present invention to provide an automotive navigation system without such disadvantages as in the prior art. A storage means included in the system has not stored therein picture information of an actual map, but instead has stored therein the geographical names and the geographical positions of points as well as the respective declinations of the earth magnetism of the points. When the geographical names of a departure point and a destination point are entered through an input unit, a control circuit reads out from the storage means the respective positions of the points entered. The control circuit controls a display unit to display on a display screen marks respectively indicating the departure point, the destination point, and the current position of a vehicle on an adequately reduced scale determined by the positions of the departure and destination points. A point nearest to the current position of the vehicle while the vehicle is being driven is determined and retrieved from the storage means. On the basis of the declination information corresponding to this retrieved point, the detected vehicle heading direction is corrected to make an accurate computation of the current position of the vehicle, whereby this arrangement of an automotive navigation system can perform a fully practical navigation function even with a small sized cheap memory and arithmetic unit.

More specifically, from the running distance and the vehicle heading respectively provided by a detecting means, e.g. a chartometer, for detecting the running distance of a vehicle and a detecting means, e.g. an azimuth meter, for detecting the vehicle heading by the detection of the earth magnetism, a computing means computes the current position of the vehicle. The computer is connected to an initializing means for initially setting the current position of the vehicle. A display for enabling a planar display according to a two-dimensional Cartesian coordinate system and a storage means having stored therein information including a geographical name, the geographical position thereof, and the declination of the earth magnetism for each of a plurality of points are also provided. The storage means is interconnected to a point setting means which designates the respective geographical names of a departure point and a destination point of the vehicle, reads out respective positional information corresponding to the entered geographical names from the storage means, and sets the positional information read out as the position of the points. On the basis of the mutual positional relationship between the departure point and the destination point set by the point setting means, a display control means controls a display means to display marks indicating the positions of the points at predetermined positions on the screen of the display means and a mark indicating the current position of the vehicle on the screen on a reduced scale determined by the positions of the departure point and the destination point. Furthermore, there is provided a correction means which retrieves from the storage means a point nearest to the current position of the vehicle and corrects the vehicle heading based on the declination of that point. This arrangement allows the operator to accurately note the position of the vehicle while driving by viewing the positional relationship of the marks indicative of the departure point, the destination point, and the current position of the vehicle displayed on the screen.

The current position computing means preferably includes means for determining a relative angle derived from the earth magnetism and the vehicle heading.

The correction means preferably includes means for calculating the distance between the current position of the vehicle and each of the points stored in the storage means, means for determining a point having the minimum distance from the current position of the vehicle, means for retrieving the declination of the determined point, and means for subtracting the declination from the determined relative angle.

The display control means may comprise means for determining the distance and the positional relationship between the departure and destination points from the positional information of both points set by the point setting means, and means for causing the display means to display the marks respectively representative of the positions of both points based on the determined distance and positional relationship and to display, on the reduced scale determined by the departure and destination points, a mark representative of the current position of the vehicle on the display means.

BRIEF DESCRIPTION OF THE DRAWINGS

The present invention will be readily apparent from the embodiments illustrated in the accompanying drawings in which:

FIG. 4 shows a table of Japanese "Kana" alphabet;

Throughout the figures, the same reference numerals indicate identical or corresponding portions.

DETAILED DECRIPTION OF THE PREFERRED EMBODIMENTS

Figure 1:
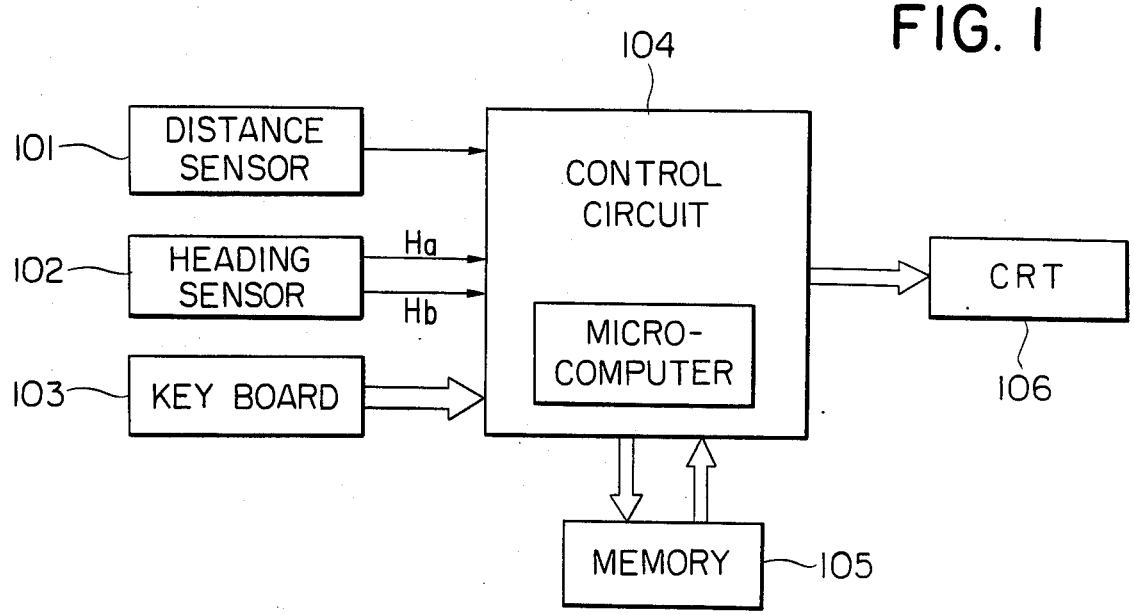
FIG. 1 shows a hardware block diagram of a preferred embodiment of an automotive navigation system according to this invention.

Referring now to the drawings, in particular FIG. 1, there is schematically shown one embodiment of an automotive navigation system according to this invention. In this embodiment, the hardware arrangement of the automotive navigation system of this invention is formed of a running distance sensor 101, a vehicle heading sensor 102, a key board 103, a control circuit 104, a semiconductor memory 105 and a CRT 106, as shown in FIG. 1. The distance sensor 101 detects the rotational speed of a vehicle's wheel by means such as an electromagnetic pickup or a reed switch, and provides, as a detection output therefrom, pulses the frequency of which is proportional to the rotational speed of the vehicle's wheel to the control circuit 104.

Figure 2:
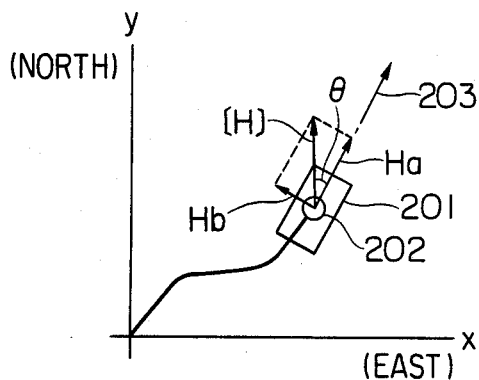
FIG. 2 shows a graph for explaining a vehicle's heading sensor used in FIG. 1.

The heading sensor 102 comprises an earth magnetism detector 202 of a flux-gate type which is fixed on a vehicle 201 as shown in FIG. 2, decomposes the earth magnetism [H] (vector) detected by the detector 202 into a component Ha of the running heading 203 of the vehicle 201 and a component Hb which is perpendicular to Ha, and outputs these signals to the control circuit 104.

Figure 3:
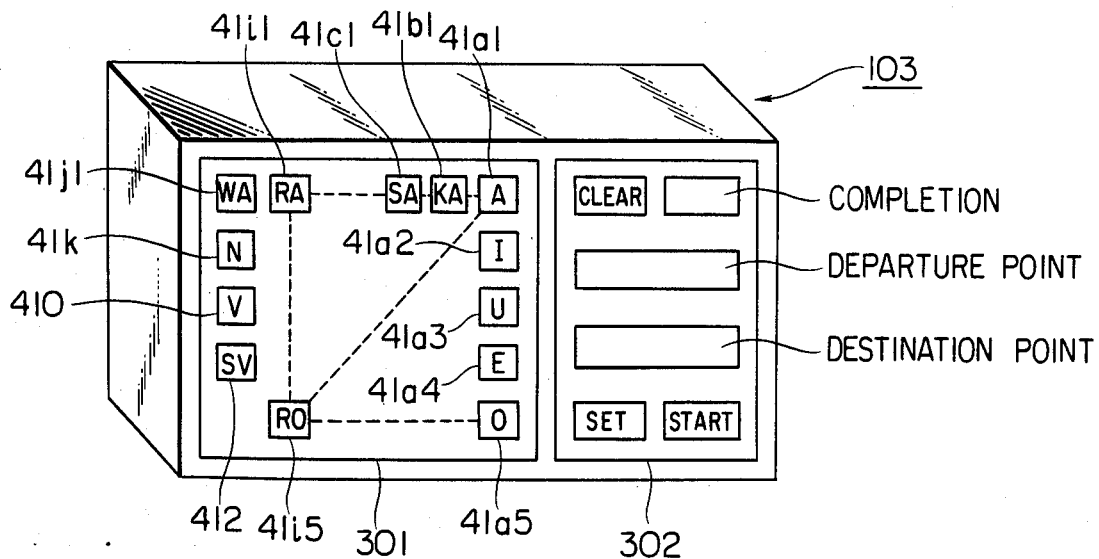
FIG. 3 shows a perspective view of a key board used in FIG. 1.

As illustrated in the perspective view of FIG. 3, the key board 103 includes a character key portion 301 and a control key portion 302. The character key portion 301 consists of character keys representative of the "A" to "N" Japanese alphabet called "Kana", which will be hereinafter represented by capital letters for the convenience's sake, as well as a voiced sound key represented by "V" and a semi-voiced sound key represented by "SV" which are utilized in combination with the character keys to generate the remaining Kana characters as shown in table in FIG. 3. The control key portion 302 consists of control keys indicative of "CLEAR", "SET", "DEPARTURE POINT", "DESTINATION POINT", "COMPLETION", and "START" functions. The indications of the keys activated on the key board 103 are read in the control circuit 104.

The character key board 301 is utilized to input all syllables known as "Kana" characters representative of all the syllables utilized in speaking Japanese.

A Japanese "Kana" Table (alphabet) is shown in FIG. 4 in which all the Kana characters are represented by Roman characters. Specifically, the table comprises 44 CLEAR SOUND Kana characters from A to WA enclosed with a thick line in which rows 41a–41j are respectively called "A" row, "KA" row, "SA" row, "TA" row, "NA" row, "HA" row, "MA" row, "YA" row, "RA" row and "WA" row, respectively, an "N" SOUND Kana character shown in row 41k and enclosed also with a thick line, VOICED SOUND Kana characters shown in rows 41m–41o, SEMI-VOICED SOUND Kana characters shown in row 41p, CONTRACTED SOUND characters shown in rows 41q–41w, VOICED CONTRACTED SOUND Kana characters shown in rows 41y–41z and SEMI-VOICED CONTRACTED SOUND characters shown in row 41zz.

Next, the manner of entering these Kana characters into the system using the keys 301 will be described. Referring to FIG. 3, a first column of keys 41a1, 41a2, 41a3, 41a4, and 41a5 shown in FIG. 3 is utilized to enter the respective CLEAR SOUND Kana characters "A", "I", "U", "E" and "O" shown in row 41a in FIG. 4, second column of keys represented by key 41b1, in FIG. 3 is utilized to enter the respective CLEAR SOUND Kana characters "KA", "KI", "KU", "KE" and "KO" shown in row 41b, and so on for the remaining CLEAR SOUND Kana characters as represented in the Kana table shown in FIG. 4 by the keys 41a1–41k. Key 41j1 represents the CLEAR SOUND Kana character "WA" while key 41k represents the Kana N. The key 410 is utilized in combination with the keys for generating the CLEAR SOUND characters to generate the VOICED SOUND characters. The key 412 is utilized in combination with the keys for generating the CLEAR SOUND Kana characters to generate the SEMI-VOICED SOUND Kana characters. For example, to generate the SEMI-VOICED SOUND "PA", first the CLEAR SOUND key representative of the Kana SOUND "HA" is pressed after which the key 412 is pressed, thereby changing the entered sound from "HA" to "PA". Similarly, the SEMI-VOICED SOUND Kana characters "PI", "PU", "PE" and "PO" are entered by first entering the respective CLEAR SOUND Kana characters "HI", "FU", "HE" and "HO", and then pressing the key 412, respectively.

The VOICED SOUND Kana characters are entered as follows. First a CLEAR SOUND KEY is pressed and then the key 410 is pressed. For example, to input the VOICED SOUND Kana character "GA", first the Kana character "KA" is entered by pressing the corresponding CLEAR SOUND key, and then the key 410 is pressed to change the entered Kana character from "KA" to "GA". Similarly, by pressing the key 410, entered CLEAR SOUND Kana characters "KI", "KU", "KE" and "KO" can be changed to "GI", "GU", "GE", and "GO", the characters "SA", "SHI", "SU", "SE", and "SO" can be changed to "ZA", "JI", "ZU", "ZE" and "ZO", characters "TA", "CHI", "TSU", "TE" and "TO" can be changed to "DA", "JI", "ZU", "DE" and "DO". and characters "HA", "HI", "FU", "HE" and "HO" can be changed to "BA", "BI", "BU", "BE" and "BO", respectively.

The Kana "N" can be entered upon pressing the key 41k.

Next, the manner of entering the CONTRACTED SOUND Kana characters will be described. For example, for entering the city name Kyoto, the CONTRACTED SOUND Kana "KYO" and the CLEAR SOUND "TO" must be entered. To insert the Kana "KYO", first the key representative of the Kana "KI" is pressed after which the key representative of the Kana "YO" is pressed. Next, the key representative of the Kana "TO" is pressed, thereby inputting the word "KIYOTO". If no city "KIYOTO" exists in the memory, the system will automatically display the city KYOTO, whereby the CLEAR SOUNDS "KI" AND "YO" are automaticlly changed to the CONTACTED SOUND Kana "KYO". Similarly, all the other CONTRACTED SOUND Kana can be generated by entering the closest combination of CLEAR SOUND Kana.

The lines I–IV shown in FIG. 4 joining the the CLEAR SOUND Kana rows to the VOICED SOUND Kana rows are indicative of the respective transformations which occur to the respective Kana when the key 410 is pressed and the line IV' indicates the transformation which occurs when the key 412 is pressed after the respective CLEAR SOUND Kana have been entered.

The entry of Kana character by the activation of a key of the character key portion 301 is read in the control circuit 104.

The semiconductor memory 105 is composed of, for example, an 8 bit-ROM (Read Only Memory) which has stored therein information consisting of geographical names (i.e. city names, town names, etc.) of points, the geographical positions thereof, and the declination of the earth magnetism of the points. The stored information is read out by the control circuit 104.

Figure 5:
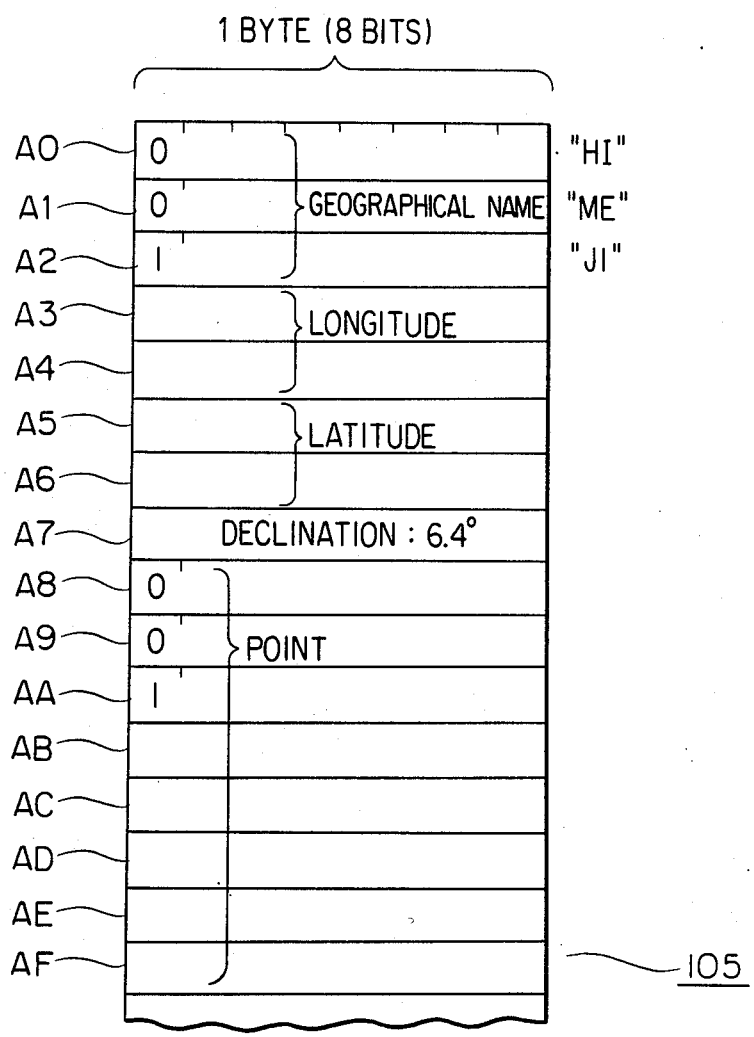
FIG. 5 shows a table of geographical point information stored in a semiconductor memory used in FIG. 1.
Figure 6A:
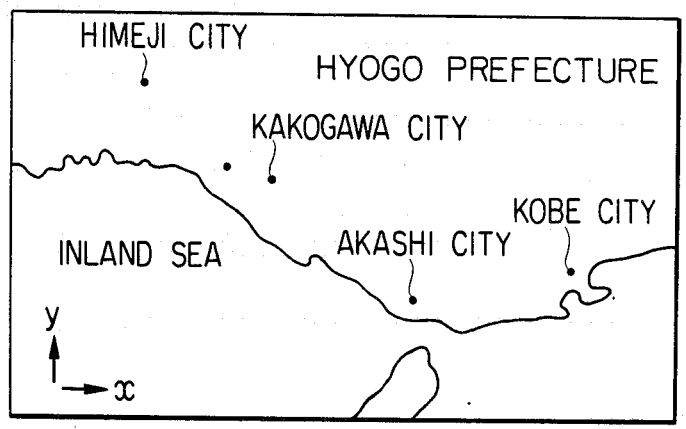
FIG. 6A shows a map of a southern part of Hyogo Prefecture of Japan and FIG. 6B shows a relationship between the map of Japan and the coordinates thereof.
Figure 6B:
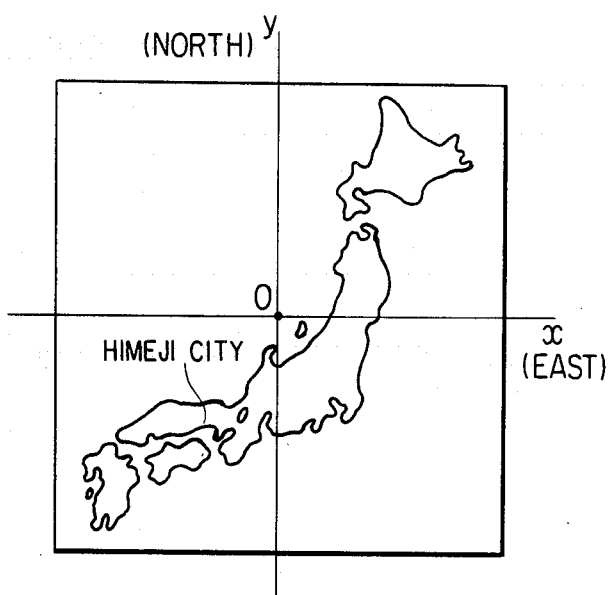

For example, the point information of the city hall of HIMEJI (i.e Himeji) City in Japan shown in FIGS. 6A and 6B is stored in addresses A0–A7 in a memory table of the semiconductor memory 105 illustrated in FIG. 5. In the addresses A0–A2, "HIMEJI" as a geographical name information is sequentially stored in the form of the codes respectively representative of the Japanese "Kana" characters "HI", "ME", and "JI". The most significant bits of each of the addresses A0–A2 serve as flags for identifying those addresses as geographical information in which the address A2 having stored therein the last character of the geographical name information is assigned "1" while the other addrsses A0 and A1 are assigned "0", as shown in FIG. 5. Therefore, the remaining seven bits of each of the addreesses A0–A2 represent a "Kana" character. With seven bits, it is possible to express all of the "Kana" characters having a clear sound, a voiced sound, a semi-voiced sound, a double sound, and a contracted sound, as illustrated in FIG. 4. The memory addresses A3–A6 have stored therein the positional information of Himeji City in which the addresses A3 and A4 serve to store the longitude of Himeji City while the addresses A5 and A6 serve to store the latitude of Himeji City. Address A7 has stored therein the declination which has an approximate value of 6.4° for Himeji City.

Similarly, addresses A8–AF have stored therein the point information of, for example, "Kobe" which is entered as "Koube" to express "Kobe" in a more accurate manner in Japanese. In FIG. 6A, there is shown a map of a southern part of Hyogo Prefecture including Himeji City and Kobe City as noted above.

Meanwhile, there exist about 680 cities all over Japan while by preparing about 300 geographical names including the names of wards, towns, villages, interchanges, stations, castles, lakes, passes, mountains, and peaks per one prefecture, about 13800 geographical names should be prepared in total for 46 divisions of Japan (including one Metropolitan District and 45 prefectures but not including Okinawa Prefecture). Supposing that the number of characters of a geographical name is four on the average which requires 4 bytes, the positional information requires 4 bytes (2 bytes for x coordinate (abscissa); 2 bytes for y coordinates (ordinate)) as indicated above and the declination information requires 1 byte, one point information requires 9 bytes in total so that 124200 bytes are required to store 13800 points of Japan.

In order to store the information of 13800 points, there are required four ROM's each of which has the maximum storage capacity of 256K bits as is commercially available at present. However, with a ROM of 1M bit which is expected to be commercially available in the near future, only one ROM would be sufficient, in which a small-sized, light, and highly reliable semiconductor memory can be utilized.

To obtain the positional information, coordinate axes X and Y may be set for the convenience's sake as shown by the map of Japan in FIG. 6B whereby geographical coordinates (xi, yi) (i=1, 2, ---) represented by the relative distance on the basis of the coordinate axes may be stored in the memory. In this case, as shown in FIG. 6B, Japan is assigned a 1700 Km square in which this 1700 Km length is assigned 2 bytes (16 bits) of the memory addresses A3 (or AB) and A4 (or AC) for the abscissa (X-distance) and 2 bytes of the memories A5 (or AD) and A6 (or AF) for the ordinate which are representative of the Longitude and Latitude positional informaion of Himeji City or Kobe City, respectively. Therefore, 1 bit is assigned about 26 m which results in a practical unit.

While the declination information has been represented by 1 byte in this embodiment as noted above, the reason for this is that the declination only varies about 5-10 degrees for all of the geographical point in Japan from Hokkaido to Kyushu as indicated above so that if 1 byte is assigned for the declination information as in the above, 1 bit will be assigned about 0.02 degrees ($=5/2^8$) which can be realized in a fully practical unit.

Figure 7:
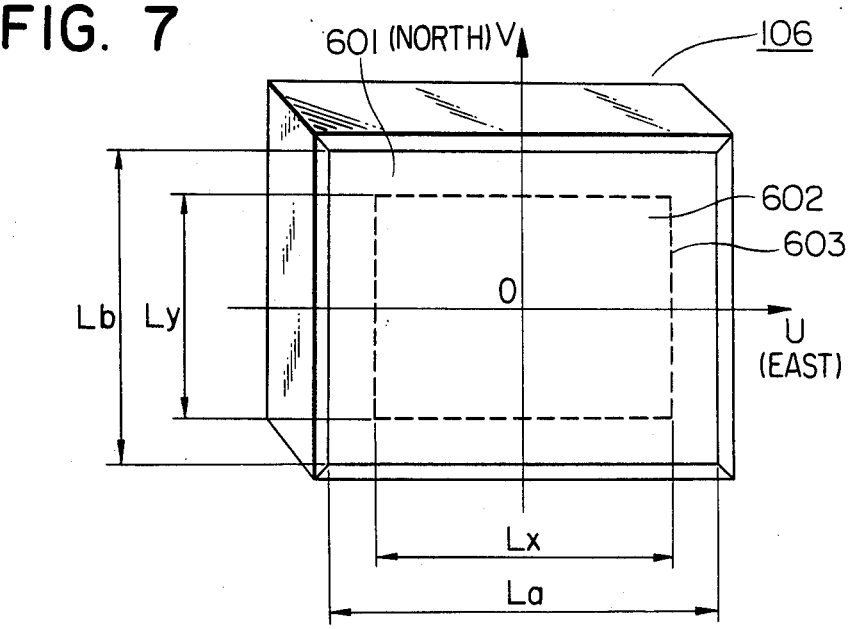
FIG. 7 shows a perspective view of a display such as a Cathode Ray Tube used in FIG. 1 for explaining a relationship between the screen of the CRT and the coordinates on the screen.

The display unit 106 may comprise a conventional CRT and is assumed to have a rectangular screen 601 as shown in the exterior view of FIG. 7. It should be noted that coordinate axes U and V are Cartesian coordinate axes perpendicular to each other to indicate screen coordinates (u, v) in the screen 601 on which the marks of a departure point, a destination point, and the current position of the vehicle are to be indicated, as will be described later.

The control circuit 104 comprises a well known micro-computer, and includes various I/O interface circuits (not shown). The control circuit 104 reads out the positional information from the semiconductor memory 105 on the basis of the information of a geographical name which is entered by the activation of the key board 103, determines an adequate reduced scale from the positional relationship between the departure point and the destination point, and generates mark signals indicative of the points. Also, the control circuit 104 inputs signals from the running distance sensor 101 and the heading sensor 102 to compute the current position of the vehicle on the basis of said signals, and generates a mark signal indicative of the current position of the vehicle in the predetermined reduced scale and controls the CRT 106 to display the marks at the corresponding coordinates on the screen 601 based on said mark signals. Furthermore, the control circuit 104 retrieves a point nearest to the current position of the vehicle while the vehicle is being driven from the semiconductor memory 105 and carries out a processing for the correction of the vehicle heading by means of the heading signal from the heading sensor 102 based on the declination information of that point.

The operation of the control circuit 104 will now be described in detail with reference to flow charts illutrated in FIGS. 8A-8I.

FIG. 8A illustrates the flow chart of a main routine of the program used for the control circuit 104. This general flow chart is started by an operation such as an electrical supply operation for the control circuit 104. At step S101, variables are initialized, and then, a subroutine S102 for a preparation processing for setting points, a subroute S103 for a setting processing of a departure point, a subroutine S104 for a setting processing of a destination point, a subroutine S105 for a mark displaying control processing, a subroutine S106 for an initializing processing of the current position, and a subroutine S107 for a vehicle heading correction processing are repeatedly sequentially executed.

More specifically, an operator activates or depresses the "CLEAR" key of the key board 103 before setting a departure point and a destination point. Consequently, in a flow chart of FIG. 8B illustrating the details of the subroutine S102 for the preparation processing of the point setting, the above depression of the key is detected at Steps S201 and S202, and then, memories Pn, X, Y, θ, Xs, Ys, Xg, and Yg (not shown), which will be described later, for setting respective points are all cleared to zero at Step S203.

Then, a departure point is entered, that is , when for example, "Himeji City" is to be set, the "Departure POINT", "HI", "ME", "SHI", "V" (key 410 and "SET" keys on the key board 103 are sequentially depressed. Consequently, in a flow chart of FIG. 8C illustrating the details of the subroutine S103 for the setting processing of the departure point shown in FIG. 8A, the depression of the "DEPARTURE POINT" key is first detected at Steps S301 and S302 whereby a subroutine S303 for a geographical name entering processing and a point retrieving processing is executed. At Step S401 in a flow chart in FIG. 8D illustrating the details of the subroutine S303, the contents of the entered key are read in, and when the contents of the entered key are found to be characters at Step S402, they are stored in the memory Pn (n=1, 2,---) for storing the combined characters of geographical names. Every time a character key is depressed once, Steps S401-S403 are executed so that "HI" is stored in a memory P1, "ME" in a memory P2, "SHI" in a memory P3, and "V" in a memory P4, respectively, these memories P1-P4 being not shown. Finally, the depression of the "SET" key is detected at Steps S402 and S404, and at Step S405 the combination of the entered characters "HI", "ME", "SHI", and "V" is retrieved from the semiconductor memory 500 whereby point information having the combination of the characters "HI", "ME", "SHI" and "V" (the combination of "SHI" and "V" is regarded as "JI" on this retrieval) stored in the memory addresses A0-AF is retrieved and at Step S406 the positional information of the point information stored at the memory addresses A3-A6 and the declination information stored at the memory address AF are read out. The contents of the addresses A3 and A4 are stored in the memory X, the contents of the addresses A5 and A6 are stored in the memory Y, and the contents of the address AF are stored in the memory θ, respectively.

Then, the program returns to Step S304 in the flow chart of FIG. 8C where the retrieved positional information in the memories X, Y, and the declination information in the memory θ are respectively transferred to the memories Xs, Ys, and θs, which are utilized to store the X (abscissa) coordinate component, Y (ordinate) coordinate component, and the declination, respectively of the inputted departure point. Hereby, the setting processing of the subroutine S103 for the departure point has been completed.

Next, a destination point is entered in the subroutine S104 shown in FIG. 8A. When, for example, the city Kobe which is identical to Koube in Japanese as described before is selected, the "DESTINATION POINT", "KO", "U", "HE", "V" keys (key 410), and "SET" on the key board 103 shown in FIG. 3 are sequentially depressed. Namely, after an operator has depressed the "DESTINATION POINT" key instead of the "DEPARTURE POINT" key, he/she may depress the keys in the same process as with the case of the entry of the geographical name of the departure point. Consequently, the subroutine S104 for a destination point setting processing in FIG. 8A will be executed. In FIG. 8E illustrating the detailed flow chart of the subroutine S104, the same operations as those for a departure point setting processing which has been described with reference to FIG. 8C are carried out. Namely, the activation of the "DESTINATION POINT" key is detected at Steps S501 and S502 in FIG. 8E and then the program proceeds to Step S503 which corresponds to Step S303 in FIG. 8C so that the description thereof will not be repeated. After the execution of Step S503, at Step S504 the information of the retrieved positional information in the memories X and Y are respectively transferred to the memories Xg and Yg for the destination point. It is to be noted that the contents of the memories Xg and Yg respectively denote the X coordinate value and the Y coordinate value of the positional information of the inputted destination point.

After the settings of the departure point and the destination point have been thus processed, the operator depresses the "COMPLETION" key. Consequently, the subroutine S105 for the mark display control processing illustrated in FIG. 8A will be executed along a flow chart illustrated in FIG. 8F. In this flow chart, at Steps S601 and S602, the depression of the "COMPLETION" key is detected. Then, as will be described hereinafter, a reduced scale is determined such that marks respectively indicative of the departure point and the destination point may be displayed on the periphery 603 of a rectangular zone 602, having a lateral length of Lx and a longitudinal length of Ly, preliminarily imaginarily set on the screen 601 of the CRT 106 shown in FIG. 7.

Namely, as set by the subroutines S103 and S104 respectively for the departure and the destination point setting processings, the coordinates of the departure and the destination points are respectively (Xs, Ys) and (Xg, Yg). At Step S603, the ratio of the latitudinal length Lx of the rectangular zone 602 of the screen 601 to a distance |Xs-Xg| in the lateral direction (from East to West) between the departure point and the destination point on the abscissa is determined as $Rx=Lx/|Xs-Xg|$, and the ratio of the longitudinal length Ly of the rectangular zone 602 of the screen 601 to a distance |Ys-Yg| in the longitudinal direction (from North to South) between the departure point and the destination point on the ordinate Y is determined as $Ry=Ly/|Ys-Yg|$. Then, at Step S604, the magnitudes of the above ratios Rx and Ry are compared. If $Rx \leq Ry$, Rx is determined to be a reduced scale R while if $Rx > Ry$, Ry is determined to be the reduced scale R (Steps S 605, S606). Then, at Step S607, the coodinates (Xo, Yo) of the middle point of the departure point and the detination point are calculated on the basis of the following equations:

$$Xo=(Xs+Xg)/2$$

$$Yo=(Ys+Yg)/2$$

and in order that the middle point may correspond to the central point, i.e. the origin (u=0, v=0). of the rectangular zone 602, the conversion of the coordinates and the reduction rate of the reduced scale are calculated at Step S608 on the basis of the following equations:

$$Us = R(Xs - Xo)$$

$$Vs = R(Ys - Yo)$$

$$Ug = R(Xg - Xo)$$

$$Vg = R(Yg - Yo)$$

where (Us, Vs) represents the coordinates of the departure point on the screen 602, and (Ug, Vg) represents the coordinates of the destination point on the screen 602. As a result, the coordinates of the departure point and the destination point are respectively positioned on the outer periphery 603 of the rectangular zone 602.

Figure 9A:
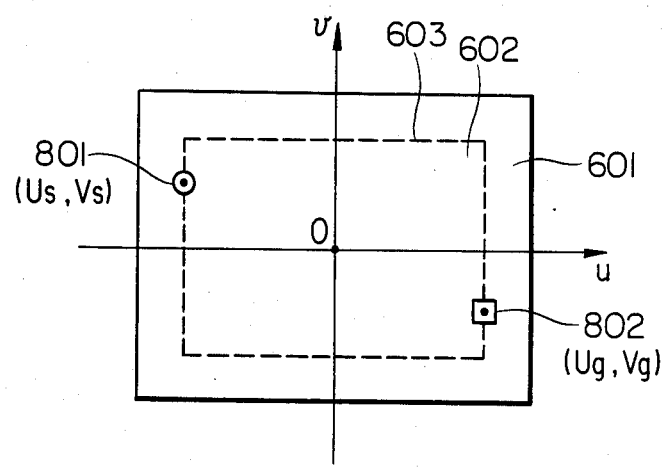
FIGS. 9A and 9B respectively show displayed examples indicating marks of departure, destination, and/or a vehicle's current position of a vehicle on the screen of a CRT; and, FIG. 10 shows a functional block diagram of a basic arrangement of an automotive navigation system in accordance with this invention.

Next, at Step S609, a display signal is outputted to the CRT 106 from the control circuit 104 so that a mark 801 of the departure point and a mark 802 of the destination point may be displayed on the screen 601, shown in FIG. 9A, respectively at the calculated coordinates (Us, Vs) and (Ug, Vg). Thus, the execution of the subroutine S105 of FIG. 8A has been completed.

Now if the vehicle is positioned at the departure point set, the operator may immediately depress the "START" key on the key board 103 while if the vehicle is positioned a little far from the coordinates of the departure point, the operator may depress the "START" key when the vehicle has reached the geographical coordinates (Xs, Ys) which corresponds to the coordinates (Us, Vs) on the screen 12a of the departure point. According to this, the subroutine S106 for the initializing processing of the current position of the vehicle illustrated in FIG. 8A will be executed along a flow chart illustrated in FIG. 8G. In this flow chart, at Steps S701 and S702, the depression of the "START" key is detected, and then at Step S703 the geographical coordinates (Xs,Ys) of the departure point are set at coordinate memory addresses (xp, yp) (not shown) storing the coordinates of the current position of the vehicle, used for an integral computation of the current position of the vehicle. Also, at Step S704 the declination θs of the departure point is set as an initial value at a memory address θv for the correction of the declination, which will be described later.

Figure 8G:
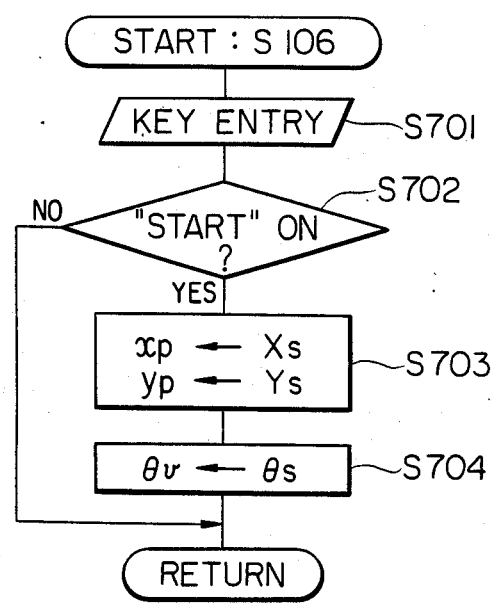
FIG. 8A shows a main flow chart of the program executed by a control circuit shown in FIG. 1, and FIGS. 8B–8I respectively show detailed flow charts of suboutlines of the main flow chart in FIG. 8A.
Figure 8H:
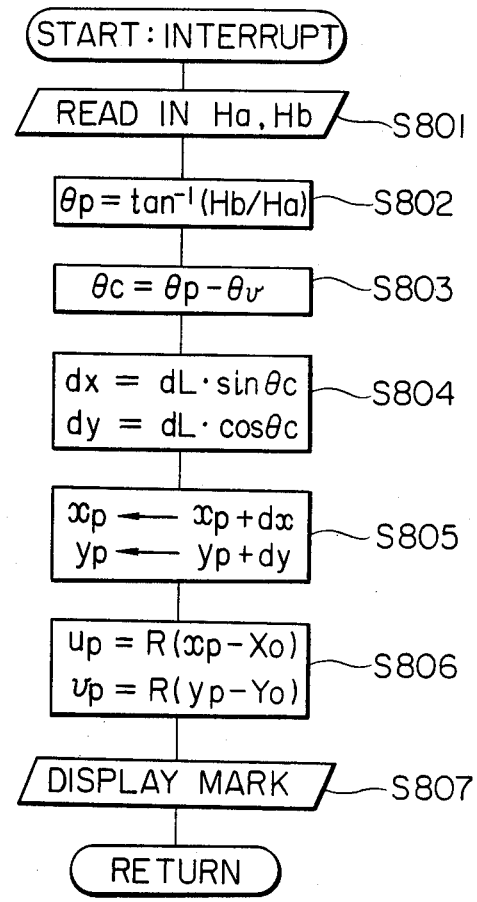

Thus, with the settings of the departure point, the destination point and the current position of the vehicle having been completed and with the vehicle being continuously driven, an interrupt command is inputted to the micro-computer of the control circuit 104 each time the running distance sensor 101 generates a pulse at an interval of a unit running distance dL (for example, 1m), thereby executing an interrupt processing shown in FIG. 8H.

Referring to the flow chart of FIG. 8H, the heading signals Ha and Hb are read in the micro-computer of the control circuit 104 at Step S801, and an angle $\theta p$ derived from the earth magnetism [H] (vector) shown in FIG. 2 and the vehicle's heading 203 of the vehicle 201 is calculated at Step S802 from the following equation:

$$\theta p = \tan^{-1}(Hb/Ha)$$

At Step S803, an error due to the declination is corrected according to the following equation:

$$\theta c = \theta p - \theta v$$

to obtain the vehicle's heading $\theta c$ which is geographically accurate. Then, heading components dx and dy of the unit running distance dL with respect to the coordinate axes X and Y shown in FIG. 6B are calculated at Step S804 according to the following equations:

$$dx = dL\sin\theta c$$

$$dy = dL\cos\theta c$$

and are added to the values integrated so far in the addresses xp and yp of the coordinate components of the current position of the vehicle at Step S805.

Figure 9B:
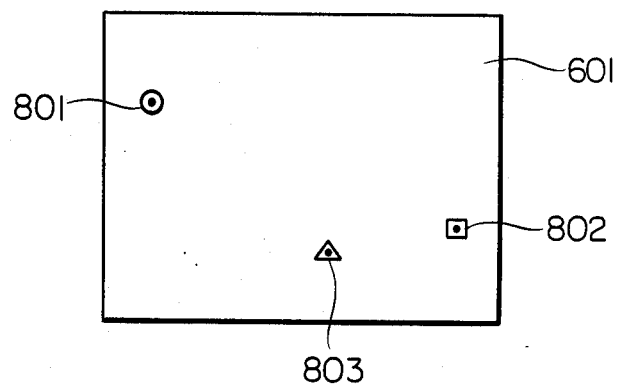

Then, at Step S806, the coordinates (up, vp) of the current position of the vehicle on the screen 601 are calculated according to the following equations:

$$up = R(xp - Xo)$$

$$vp = R(yp - Yo)$$

on the basis of the reduced scale R, and then at Step S807, a mark signal is outputted from the control circuit 104 to the CRT 106 so that a mark 803 indicative of the current position of the vehicle may be displayed as shown in FIG. 9B at the coordinates (up, vp) on the screen 601.

While the vehicle is being driven, the interrupt routine illustrated in FIG. 8H is executed and the subroutine S107 for a vehicle heading correction processing in FIG. 8A is executed.

Figure 8I:
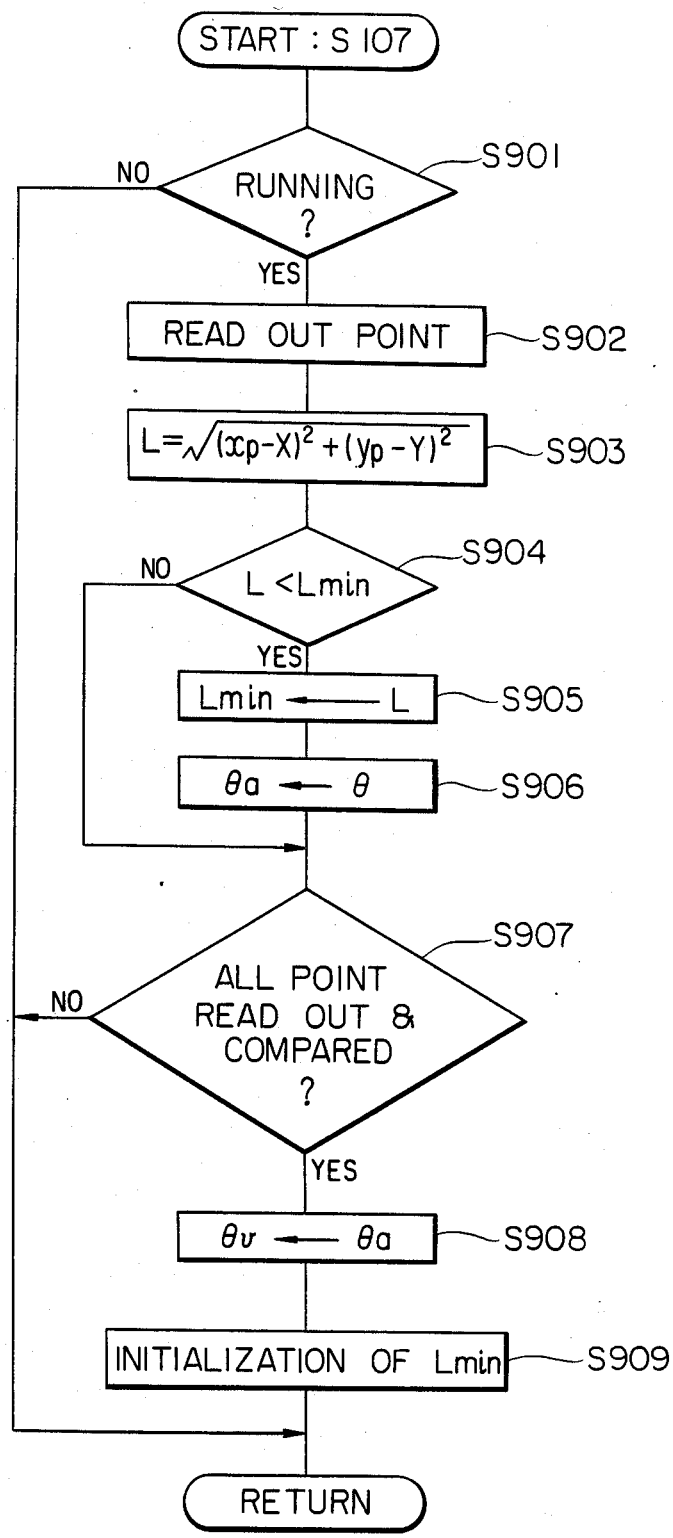

FIG. 8I illustrates a flow chart for determining the declination $\theta v$ of a point nearest to the current position of the vehicle. First of all, at Step S901, it is determined whether or not the vehicle is being driven, which is readily determined from the period of the output signal of the running distance sensor 101. If it is found that the vehicle is being driven, Step S902 is executed where one point information is read out from the semiconductor memory 105. It is needless to say that the program is ready to read out a point information during the next execution which is stored next to the point information read out at this time. At Step S903, a distance L between the point read out having coordinates (X, Y) and the current position having the coordinates (xp, yp) is determined along the following equation:

$$L = \{(xp - X)^2 + (yp - Y)^2\}^{\frac{1}{2}}$$

At Step S904, the currently computed distance L is compared with the minimum value Lmin of the distances obtained so far. It is to be noted that the initial value for this comparison is properly set. If it is found that the computed distance L is smaller than the minimum value Lmin, then at Step S905 the distance L is set as an updated minimum value Lmin. At Step S906, the respective declination angle $\theta$ of this point is stored in a temporary memory $\theta a$. At Step S907, it is determined whether or not all of the point information stored in the semiconductor memory 105 have been read out and, accordingly, whether or not all of the comparisons of a current distance L with the minimum distance Lmin have been carried out. If it is found that all of the point information is not read out for the comparison, then the program returns to the main routine illustrated in FIG. 8A while if it is found that all of the point information have been read out for the comparison, then the program proceeds to Step S908.

At Step 908, the contents of the memory $\theta a$ having finally stored therein the declination value of a point nearest to the current position of the vehicle are set, i.e. updated in the declination memory $\theta v$ which was set at the initial stage to the declination value $\theta s$ of the departure point and is used for the declination correction. Then, at Step S909, a proper initial value is set in a memory Lmin, and then the program returns to the main routine in FIG. 8A. It should be noted that this proper initial value is preferably infinite or may be the maximum value provided by this software, or it may be a half of the distance between a pair of points which are farest to each other along stored points.

At Step S803 for the computing processing of the current position of the vehicle illustrated in FIG. 8H, it is possible to determine a geographically accurate vehicle heading $\theta c$ by the correction of the vehicle heading $\theta p$ based on the declination $\theta v$. In this case, since an update declination information is always automatically set by the continuous execution of the vehicle heading correction processing in FIG. 8I while the vehicle is being driven, the operator needs no particular operation therefor.

Figure 10:
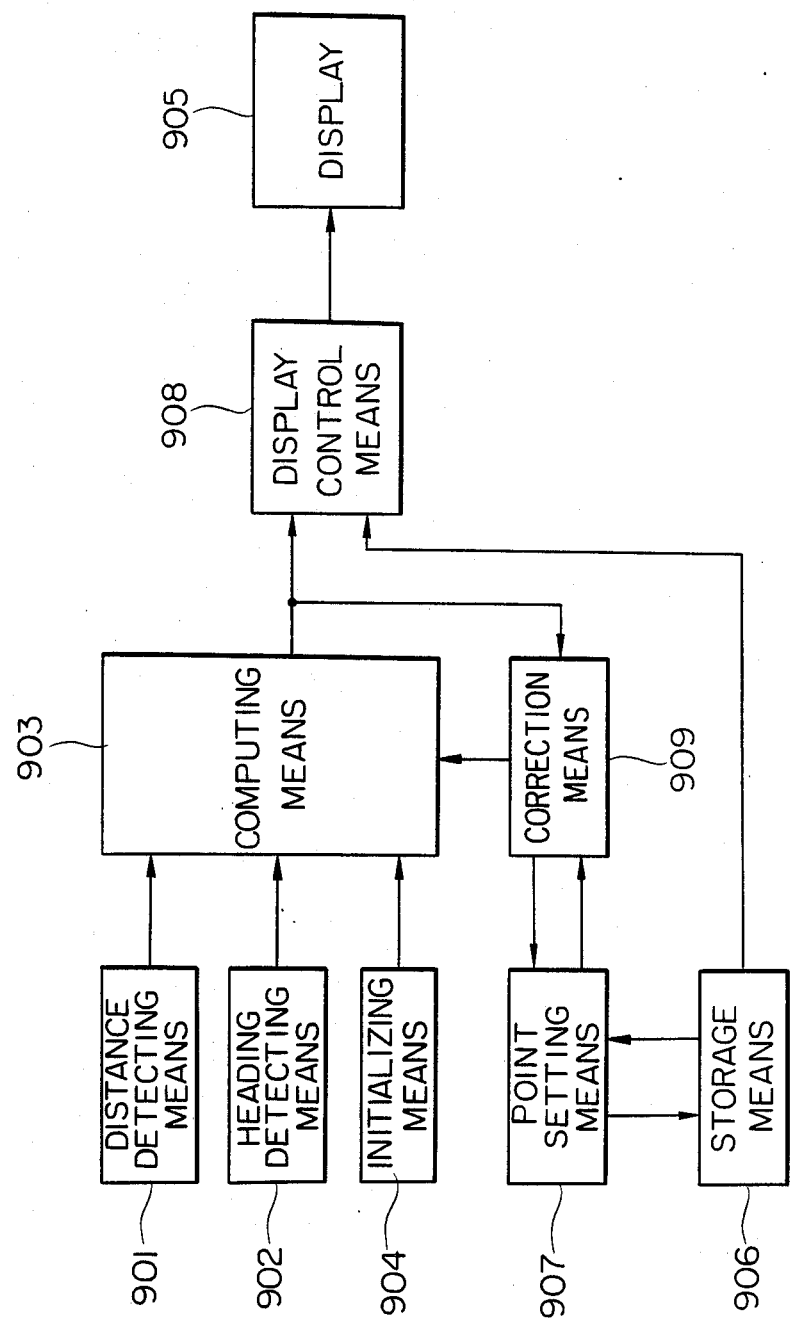

In FIG. 10 is shown a functional block diagram of an automotive (onboard) navigation system according to the vehicle heading respectively provided by a detecting means, e.g. a chartometer 901, for detecting the running distance of a vehicle and a detecting means, e.g. an azimuth meter 902, for detecting the vehicle heading by the detection of the earth magnetism, a computer 903 computes the current position of the vehicle.

The computer 903 is connected to an initializing means 904 comprising, e.g. a key board, for initially setting the current position of the vehicle. A display 905 for enabling a planar display according to a two-dimensional Cartesian coordinate system and a storage means 906 having stored therein information representative of a plurality of sets of points, each set consisting of a geographical name, the geographical position thereof, and the declination of the earth magnetism. The point information storage means 906 is interconnected to a point setting means 907 which designates the respective geographical names of a departure point and a destination point of the vehicle, reads out respective positional information corresponding to the entered geographical names from the storage means 906, and sets the positional information read out as the coordinates of the points. On the basis of the mutual positional relationship between the departure point and the destination point set by the point setting means 907, a display control means 908 controls a display means 905 to display marks indicating the positions of the points at predetermined positions of the screen of the display means 905 and a mark indicating the current position of the vehicle on the screen on a reduced scale determined by the positions of the departure point and the destination point displayed. Furthermore, there is provided a correction means 909 which retrieves from the storage means 906 a point nearest to the current position of the vehicle and corrects the vehicle heading based on the declination of that point. This arrangement allows an operator to accurately realize the position of the vehicle while driving from the positional relationship of the marks indicative of the departure point, the destination point, and the current position of the vehicle displayed on the screen.

It is to be noted that while the above embodiment of this invention has dealt with a semiconductor memory such as a ROM as a point information storage means, if a storage of a large capacity such as a floppy disc is used, then more positional information can be stored. Also, a voice input device may be substituted for a key board. Furthermore, a liquid crystal display device of a dot-matrix type may be substituted for a CRT.

In accordance with the arrangement of the system of this invention, as a departure point and a destination point of a vehicle are designated by their geographical names, the control circuit 104 reads out the positional information of a desired point from the point information as previously stored. The positional information is set as the coordinates of the points which are displayed with respective marks on an adequate reduced scale on the CRT and the current position of the vehicle which is computed every second is displayed by a mark. Meanwhile, the vehicle heading detected by a heading sensor is corrected on the basis of a declination pre-stored for a point determined to be nearest to the current position of the vehicle. Consequently, a system having preferable navigation functions suitable for boarding on an automobile is provided as follows:

(1) The picture information of an actual map is not stored in the semiconductor memory but instead point information consisting of the information of given points and respective declinations thereof is stored as a basic unit whereby the information of points over a wide range of areas can be stored.

(2) Since a departure point and a destination point are designated by their geographical names and the positional information previously stored is read out and set as the coordinates of the points, the positions of the points can be accurately set with easy operations.

(3) Since the marks indicative of both points are displayed on adequate positions of the screen 12a on the basis of the distance between the departure point and the destination point and of the positional relationship therebetween and the mark indicative of the current position of the vehicle is also displayed on a reduced scale determined by the marks of the departure point and the destination point, the operator can devote his entire energy to driving the vehicle without having to perform cumbersome operations such as the settings of the positions of the marks and the reduced scale.

(4) Since a point which is the closest to the current position of the vehicle is retrieved from a semiconductor memory and the vehicle heading is corrected according to the declination previously stored for that point, even though the vehicle transits regions the declinations of which are different from each other as the vehicle runs, a declination close to the current position of the vehicle is automatically set, whereby a geographically accurate vehicle position is determined without requiring a complicated operation such as an external operation so that an accurate computation of the current position of the vehicle is made possible.

Therefore, even a storage of a small capacity can be used as a data storage means capable of fully displaying the current position of the vehicle. As a result, an onboard automotive navigation system, which is compact and cheap, having a fully practical navigation function is realized.

It is to be noted that while the present invention has been described with reference to the above embodiments illustrated in the accompanying drawings, it should not be limited to them and may be applied with various modifications thereof without departing from the spirit of the invention.

What we claim is:

1. An automotive navigation system comprising:
a first detecting means for detecting the running distance of a vehicle; a second detecting means for detecting the heading of the vehicle; a display means for enabling a planar display based on the two-dimensional Cartesian coordinates system; a storage means for storing information comprising a geographical name and the positional information thereof for each of a plurality of points; and a control means for designating the geographical names of a departure point and a destination point, reading out the positional information of the designated geographical names in said storage means, receiving signals from said first and second detecting means to compute the current position of the vehicle, computing coordinates on said display means of marks respectively indicative of said departure point, said destination point, and the current position of the vehicle on the basis of their mutual positional relationship and in a reduced scale determined by said departure and destination points, and controlling said display means to display said marks at said computed coordinates; said storage means further storing therein the declination of the earth magnetism for each of said plurality of points, and said control means further including means for retrieving from said storage means a point which is the closest to the current position of the vehicle and for correcting the detected heading of the vehicle on the basis of the declination of said retrieved point.

2. An automotive navigation system according to claim 1 wherein said control means comprises:
a computing means for computing the current position of the vehicle from the running distance detected by said first detecting means and the vehicle heading detected by said second detecting means;
an initializing means for initializing the current position of the vehicle for said computing means;
a point setting means for setting the geographical names of said departure point and said destination point, for retrieving said geographical names from said storage means, for reading out the positional information corresponding to said geographical names, and for setting the positions of said departure and destination points according to said positional information;
a display control means for controlling said display means to display marks indicative of the respective positions of both of said points set by said point setting means in predetermined positions on said display means and to display a mark indicative of the current position of the vehicle in the reduced scale determined by said departure and destination points; and, a correction means for retrieving from said storage means a point which is the closest to the current position of the vehicle and for correcting the detected heading of the vehicle on the basis of the declination of said retrieved point.

3. An automotive navigation system according to claim 2 wherein said current position computing means includes means for determining a relative angle derived from the earth magnetism and the vehicle heading.

4. An automotive navigation system according to claim 3 wherein said correction means includes means for calculating the distance between the current position of the vehicle and each of all of the points stored in said storage means, means for determining a point having the minimum distance from the current position of the vehicle, means for retrieving the declination of said determined point, and means for subtracting said declination from said determined relative angle.

5. An automotive navigation system according to claim 4 wherein said display control means comprises means for determining the distance and the positional relationship between said departure and destination points from the positional information of said departure and destination points set by said point setting means and means for causing said display means to display said marks respectively representative of the positions of said departure and destination points based on said determined distance and positional relationship and to display, on the reduced scale determined by said departure and destination points, a mark representative of the current position of the vehicle on said display means.

6. An automotive navigation system according to claim 5 wherein said positional information of each of said plurality of points comprises information representative of the Longitude and the Latitude of said point.

* * * * *